United States Patent [19]

Sorensen et al.

[11] Patent Number: 4,904,441
[45] Date of Patent: Feb. 27, 1990

[54] METHOD OF FORMING A PELLET OF CONDENSED GAS AND A PELLET INJECTOR FOR INJECTING THE SAME INTO A REACTOR

[75] Inventors: Hans Sørensen, Roskilde; Bjarne Saas, Tåstrup; Knud V. Weisberg, Roskilde, all of Denmark

[73] Assignee: Forskningscenter Risø, Roskilde, Denmark

[21] Appl. No.: 247,941

[22] Filed: Sep. 22, 1988

[30] Foreign Application Priority Data

Oct. 23, 1987 [DK] Denmark ............................. 5568/87

[51] Int. Cl.[4] .............................................. G21B 1/00
[52] U.S. Cl. .................................... 376/101; 376/916; 264/0.5; 264/28; 264/81; 425/143; 425/160; 425/437
[58] Field of Search ................. 376/916, 101; 264/0.5, 264/28, 81; 425/143, 144, 160, 176, 437, 447

[56] References Cited

U.S. PATENT DOCUMENTS 3,626,046 12/1971 Krause et al. ........................ 264/28
3,723,246 3/1973 Lubin ................................. 376/101

FOREIGN PATENT DOCUMENTS 2105453 3/1983 United Kingdom .

OTHER PUBLICATIONS

Fusion Technology, vol. 6, 9/84, pp. 378-383, Sorensen et al.
LA-UR-74-245, 2/74, Durham, pp. 12, 58.
"Deuterium Pellet Injection in the TFR Tokamak", Olivier Lazare, pub. 1 Jul. 1985, University of Paris.
"Fast Opening Magnetic Valve for High-Pressure Gas Injection . . . ", Rev. Sci. Instrum., 57 (9), Sep. 1986.
"Simple Pipe-Gun for Hydrogen Pellet Injection", Rev. Sci. Instrum., 57 (10), Oct. 1986.
"Acceleration and Injection of D2 Pellets", Fusion Technology 1980, 15-19, Sep. 1980.
"Experiment Test of 6 mm Diameter D2 Pellets Produced by . . . ", Fusion Technology 1986, 8-12, Sep. 1986.

Primary Examiner—Harvey E. Behrend
Attorney, Agent, or Firm—Merchant, Gould, Smith, Edell, Welter & Schmidt

[57] ABSTRACT

A pellet injector for injecting pellets of condensed gas, such as hydrogen, tritium or deuterium, into a reactor comprises an arrangement of pipe guns in a cylindrical arrangement. Each pipe gun which may be made from stainless steel, has a freezing section and three axially spaced metal rings of a heat conductive metal arranged in good thermal contact with the outer surface of the pipe gun at the freezing section thereof. Each of the rings is thermally connected to a cryostat, for example by means of a copper wire. The center ring is cooled to a temperature below the condensing temperature of the gas so as to condense the gas in the freezing section of the pipe gun to form a pellet therein, and the temperature of the adjacent outer rings are maintained at temperatures exceeding the temperature of the center ring so as to obtain a pellet of a desired size. The pellets formed in the pipe guns may be expelled therefrom by a pressurized gas force pulse and injected into a reactor. The pressurized gas force pulse may be provided by using a special solenoid valve.

17 Claims, 5 Drawing Sheets

METHOD OF FORMING A PELLET OF CONDENSED GAS AND A PELLET INJECTOR FOR INJECTING THE SAME INTO A REACTOR

BACKGROUND OF THE INVENTION

1. Field of the Invention

The present invention relates to a method of forming a pellet of condensed gas, such as hydrogen, tritium or deuterium, in situ within the tube or barrel of a pneumatic injector or a so-called pipe gun. One way of fuelling present experimental reactors or plasma devices, so-called "tokamaks" and other similar devices as well as future fusion reactors, is to inject solid pellets of fuel material. According to present theories of the pellet-plasma interactions such pellets should be given velocities up to $10^4$ m/sec. in fusion reactors, whereas substantially lower velocities suffice for present experimental devices.

2. Description of the Prior Art

The prior art within this field is disclosed in for example J. Lafferanderie et al., Proc. 14th SOFT 1986, p. 1367, S. K. Combs et al., Rev. Sci. Instr. 57, 1986 p. 2636, V. Andersen et al., Proc. 11th SOFT 1980, S. L. Milora et al., Rev. Sci. Instr. 57, 1986 p. 2356. and O. Lazare, These, Universite de Paris.Sud, Orsay n'd'Ordre 704. Lafferanderie et al. discloses a method of in situ condensation of hydrogen isotopes in the barrel or tube of a pneumatic pellet injector or pipe gun so as to produce a pellet therein ready for firing. The pellet is formed within a freezing cell made from copper and provided with heaters. The freezing cell which is cooled by liquid helium is mounted between stainless steel flanges which are welded to adjacent tube sections. Insulating spaces which may be filled by a thermal insulate, are defined between the freezing cell and the respective flanges. The gas to be condensed is supplied to the freezing cell from both sides.

SUMMARY OF THE INVENTION

The present invention provides a substantially simpler method of forming a pellet of condensed gas in a metal tube, such as the barrel or tube of a pellet injector or pipe gun of the type described above.

Thus, the present invention provides a method of forming a pellet of condensed gas, such as hydrogen, tritium, or deuterium, within a predetermined section of a continuous length of a metal tube, said method comprising providing a first mass of a heat conductive material around said tube section in good thermal contact with the outer surface thereof, providing second and third masses of heat conductive material on either side of and closely axially spaced from said first mass and in good thermal contact with the outer surface of the tube length, cooling said first mass to a temperature below the condensing temperature of said gas so as to condense the gas in said tube section to form a pellet therein, selectively cooling and/or heating said masses so as to maintain the second and third masses at a temperature exceeding the temperature of the first mass, and controlling the temperature of the masses so as to obtain a pellet of a desired size.

Thus, by using the method according to the invention the pellet may be condensed within a section of a simple continuous tube length, and a freezing cell may be provided therein by properly cooling said first mass of heat conductive material arranged on the outside of the tube section, and the axial temperature gradients necessary for obtaining a pellet of the desired length and quality may be obtained by suitably controlling the temperature of the second and third masses.

In principle, the said heat conductive masses could be made from any kind of material having good heat conductivity and sufficient heat capacity for suitably controlling the temperature of the masses. In the preferred embodiment of the method according to the invention the said masses are made from a metal, such as silver, copper or alloys containing silver or copper. However, the presently preferred material for making the heat conductive masses is oxygen free high conductivity copper.

In the prior art method for in situ forming pellets the gas to be condensed is introduced from both ends of the tubular body comprising the freezing cell. According to the invention the gas to be condensed is introduced into the tube length at only one end thereof, whereby the pipe gun or pellet injector may be substantially simplified.

The temperature of the masses is preferably controlled by cooling the masses to a temperature below that desired and by simultaneously heating the masses so as to obtain the desired temperatures thereof. The heating means may have two heating capacities, namely heating at a low level, and heating at a high level. Heating at the low level may then be used for establishing the desired axial temperature gradient between the freezing section of the tube length and the adjacent tube section, while the high heating may be used immediately prior to firing the pellet, for example by heating the said first mass to loosen the pellet in the freezing section. Thereafter the pellet may be expelled from the tube length or barrel by means of pressurized gas, such as hydrogen or helium, so as to inject the pellet into a reactor.

The present invention also provides a pellet injector which may be used in carrying out the method described above, said pellet injector comprising a continuous length of a metal tube, a first mass of heat conductive material arranged around a freezing section of said tube length in good thermal contact with the outer surface thereof, second and third masses of heat conductive material arranged on either side of and closely axially spaced from said first mass and in good thermal contact with the outer surface of the tube length, means for introducing a gas into the tube length, cooling means for providing a temperature below the condensing temperature of said gas and being thermally connected to each of said masses so as to condense the gas within the freezing section, means for selectively heating said masses to control the size of the pellet, and means for pneumatically expelling a pellet formed in the freezing section from the tube length.

The gas introducing means for introducing the gas to be condensed into the tube length may be connected to the tube length at opposite sides of the freezing section in which the pellet is formed. Preferably, the gas introducing means are connected to the tube length only at one side of the freezing section, for example at the same end of the tube section as that to which the pellet expulsion means for introducing driving gas into the tube section are connected. In the preferred embodiment, however, the gas introducing means and the pellet expulsion means are connected to opposite ends of the tube length.

The masses of heat conductive material are preferably in the form of metal rings or annular metal bodies surrounding the outer surface of the tube length and being integrally connected thereto, for example by soldering or welding. The heat conductive masses or metal rings may be cooled to the necessary low temperature in any suitable manner, for example by condensed helium which may be circulated through conduits which are in thermal contact with the heat conductive masses. In a preferred embodiment, however, the cooling means comprise a cryostat, such as a flow cryostat, and the heat conductive masses or metal rings may then be thermally connected to the cooling source or cooling means by respective heat conductive members, such as metal wires which may, for example, be made from copper, preferably pure copper. In order to provide the desired axial heat gradients between the freezing section of the tube length surrounded by the said first heat conductive mass, and the tube sections surrounded by the second and third masses, respectively, the heat conductive members connecting the latter masses to the cooling source or cooling means may be somewhat less heat conductive than the member thermally connecting the first heat conductive mass or metal ring with the cooling source. As an example the first mass may be connected to the cooling means or cooling source by means of a metal wire having a cross-section exceeding the cross-section of each of the metal wires interconnecting the other heat conductive masses or rings and the cooling source.

The pellet expelling means may be of any suitable type by means of which the pellet may be expelled from the tube length or pipe gun barrel at the necessary high velocity. It is desirable to reduce the amount of driving gas to a minimum without sacrificing the desired high velocity of the pellet. This may be obtained when the pellet expelling means comprise a solenoid valve for connecting said second end of the tube length to a source of highly pressurized gas, such as hydrogen or helium, for an ultra-short period of time.

In the conventional pneumatic pellet injectors or pipe guns the solenoid valve is connected to the freezing cell through a relatively long connecting conduit with a narrow bore similar to that of the injector tube or the gun barrel, which involves relatively high pressure losses and consequently an increase in consumption of driving gas. The simplified structure of the pellet injector according to the invention permits the freezing section of the tube length to be located rather close to the said second end of the tube length to which a pellet expulsion means or the solenoid valve is connected. Alternatively, or additionally the said second end of the tube length is connected to the expelling means by a connecting tube having an inner diameter exceeding that of the tube length. Each of these measures substantially contributes to reducing pressure losses of the driving gas and, consequently, to reduction of driving gas consumption.

The continuous tube length used in the pellet injector according to the invention may be made from any suitable metal or metal alloy, such as brass, bronze, monel metal etc. In the preferred embodiment, however, the tube length is made from stainless steel, because the heat conductivity of stainless steel decreases with decreasing temperature whereby heating of the freezing section by axial heat conduction through the tube length is substantially restricted. Such heating may be further restricted by reducing the wall thickness of the tube length between said masses of heat conductive material.

A single shot pellet injector or pipe gun as that described above cannot form and fire pellets in succession at :le small time intervals which are normally required. Therefore, to meet the requirements it is necessary to use several single shot injectors at the same time. Therefore, the present invention also provides a pellet injection assembly comprising a plurality of pellet injectors as described above, the tube lengths of said injectors being arranged in converging relationship so as to direct their said first ends into a funnel-shaped end of a common guide tube leading into the reactor. It is known how to fire a pellet from a pneumatic pipe gun into a guide tube arranged in alignment with the gun barrel. Such a guide tube has an inner diameter somewhat exceeding the inner diameter of the gun barrel so that the pellet is supported by its own vapour while moving through the guide tube which is substantially at room temperature. In the pellet injector assembly according to the invention, however, a guide tube having a funnel-shaped inlet is common to a plurality of tube lengths or pipe gun barrels. This means that a succession of pellets may be fired into a reactor through a common guide tube at short time intervals. The said plurality of title lengths may be arranged in any suitable manner provided that their said first ends are positioned so that the pellets may be properly fired into the common guide tube. In the preferred embodiment, however, the tube lengths of the said plurality of pellet injectors are positioned around a common flow cooling source, such as a flow cryostat or a body heat-conductively connected to such cryostat. As an example, the tube lengths of the pellet injectors may be positioned so as to form a cone-like arrangement so that the said first heat conductive masses of the pellet injectors are positioned around and in abutting relationship with or closely adjacent to the cooling source or cryostat.

In order to thermally isolate the tube lengths of the pellet injectors these tube lengths are normally arranged within a vacuum chamber. In such case each of the plurality of pellet injectors preferably extends between first and second opposite wall parts or end walls of a vacuum chamber. All the pellet injectors may then be mounted on said first wall part which is removable from the vacuum chamber together with the pellet injectors, which are then easily accessible for servicing and replacement of parts, for example replacement of the tube lengths with tube lengths of another diameter for producing pellets of a different size.

The present invention also provides an improved solenoid operated valve for controlling the supply of driving gas to a pneumatic pellet injector, for example of the type described above, for firing pellets of condensed gas into a reactor, said valve comprising a housing defining first and second chambers therein interconnected by an interconnecting passage, a valve seat positioned at said first chamber, and a piston-like valve member unit comprising a valve member and a valve armature and being arranged in said passage so as to substantially obstruct the same and so as to be movable therein between closed and opened positions in which the valve member is in sealing engagement with and out of engagement with the valve seat, respectively, and a gas inlet for connecting said second chamber to a source of pressurized gas. The valve may be opened by supplying a short current pulse to the solenoid of the valve, whereby the valve member unit with the valve member is moved out of engagement with the valve seat. This causes pressurized driving gas to flow from the said first chamber into the tube or barrel of the pellet injector or pipe gun whereby the pressure in the said first chamber will drop suddenly. The sudden pressure drop in the first chamber creates a pressure difference between opposite ends of the piston-like valve member unit causing a sudden movement of the valve member unit with the valve member from its opened to its closed position. Because the piston—like valve member unit does not seal the passage interconnecting the first and second chambers, the first chamber will soon become recharged with pressurized driving gas flowing from the gas inlet through the second chamber and the interconnecting passage to the first chamber. Such a valve, which may be made by modifying a commercially available, very cheap valve used for other purposes, has proved very efficient. The solenoid of the valve may be connected to an electric voltage source through a switch or circuit breaker which is connected in parallel with a non-linear resistor having a resistance decreasing at increasing potential difference. The non-linear resistor preferably has a relatively high resistance at a low potential difference so that substantially no current will flow through the resistor at the relatively low voltage of the voltage source. When, however, the switch or circuit breaker is closed and reopened after a very short time period, a high voltage is induced in the solenoid. The non-linear resistor should have a sufficiently low resistance at high voltage to prevent breakdown of the switch.

BRIEF DESCRIPTION OF THE DRAWINGS

The invention will now be further described with reference to the drawings, wherein FIG. 1 diagrammatically shows a pellet injection system comprising an embodiment of the pellet injector assembly according to the invention, FIG. 5 illustrates how three injector assemblies each comprising a plurality of pellet injectors or pipe guns may be arranged in relation to a reactor.

DESCRIPTION OF PREFERRED EMBODIMENTS

Figure 1:
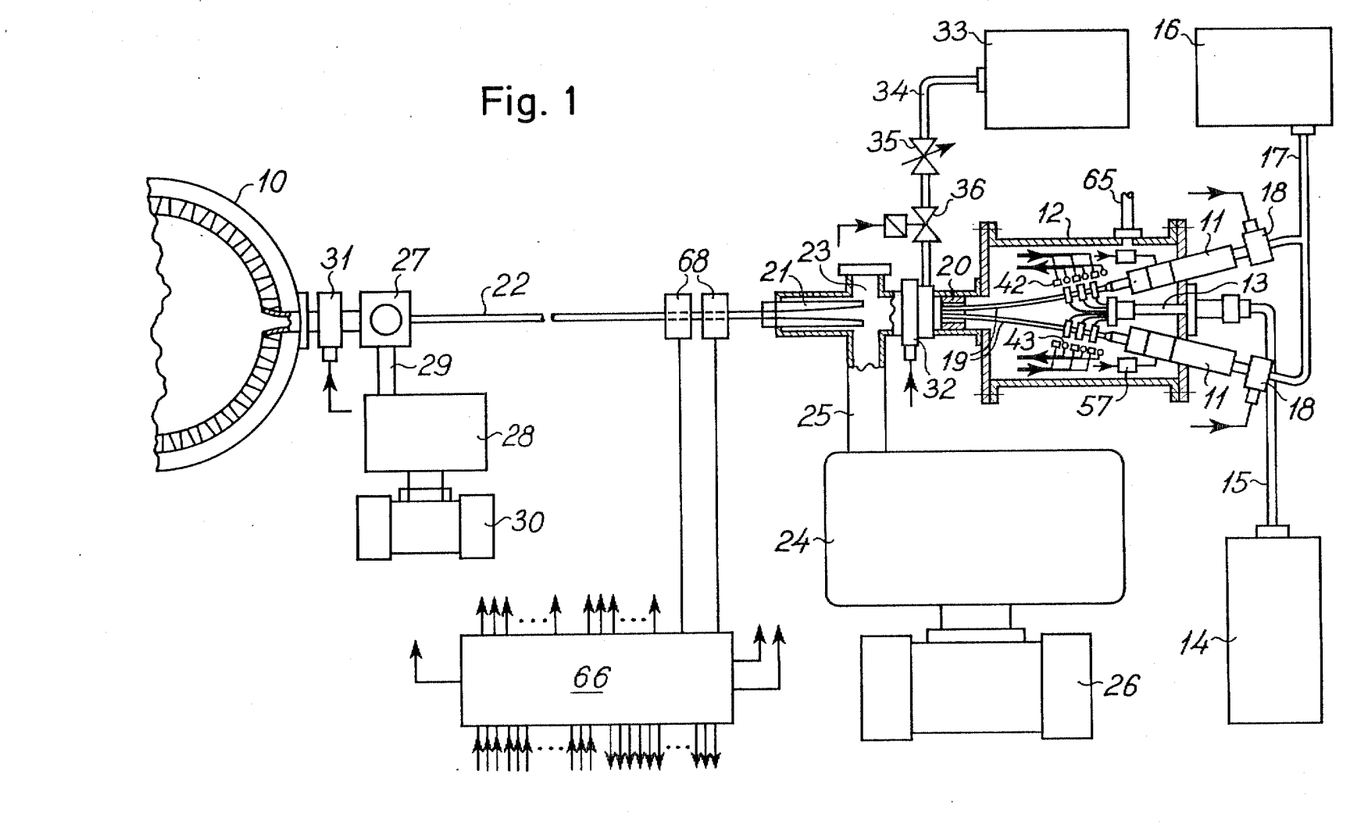
Figure 6:
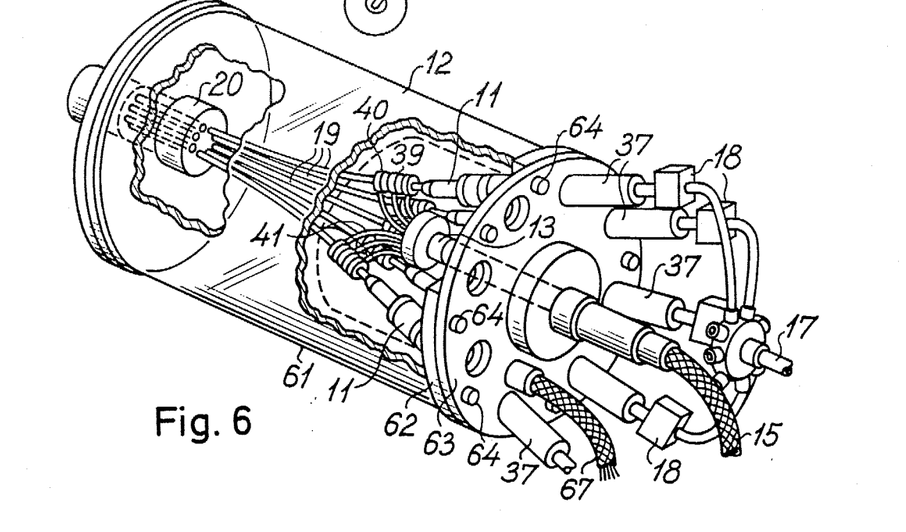
FIG. 6 is a perspective view in an enlarged scale of the pellet injector assembly shown in FIGS. 1 and 5, certain wall parts having been cut away, FIG. 7 diagrammatically illustrates an experimental arrangement of an embodiment of a pellet injector or pipe gun according to the invention.

FIG. 1 shows a reactor for plasma fuelling experiments in which reactor pellets of condensed gas, such as hydrogen or deuterium should be fired at high velocities, such as about 1200 m/s at very small time intervals, such as from 2 milliseconds up till 400 milliseconds. The condensed gas pellets are formed in and fired by a number of pellet injectors or pipe guns 11 which is arranged within a vacuum chamber 12 around a flow cryostat 13. Helium from a source 14 of condensed helium is circulated through the flow cryostat 13 through a conduit 15 so as to cool the cryostat 13. A driving gas, such as hydrogen, for use in pneumatically expelling the pellets formed within the pellet injectors is supplied from a gas source 16 to the various injectors 11 through a connecting conduit 17 and closure valves 18. Injector tubes or gun barrels 19 of the injectors are mounted in mutually converging relationship so that the free ends are arranged closely adjacent in a common collar member 20 as best shown in FIG. 6. Thus, all of the gun barrels 19 are directed into a funnel-shaped end portion 21 of a guide tube 22 which is directed into the reactor 10 as shown in FIG. 1. The funnel-shaped end portion 21 as well as the adjacent ends of the gun barrels or injector tubes 19 opens into a differential pumping chamber 23 which is connected to a vacuum reservoir 24 through a tube 25, and the vacuum reservoir 24 is connected to a Roots pump 26. A similar differential pumping chamber 27 is arranged at the end of the guide tube 22 close to the reactor 10, and this chamber 27 is connected to a vacuum reservoir 28 through a tube 29, and the reservoir 28 is connected to a turbo pump 30. The volume of the reservoir 28 is preferably smaller than the volume of the reservoir 24. A valve 31 is arranged in a tube section interconnecting the differential pumping chamber 27 with the reactor 10, and a similar valve 32 is arranged immediately upstream of the pumping chamber 23. A gas source 33 for gas, such as hydrogen, to be condensed within the pellet injectors 11 so as to form pellets in situ, is connected to the pumping chamber between the valve 32 and the free ends of the gun barrels mounted within the collar member 20. The gas source 33 is connected to the pumping chamber by means of a conduit 34 in which a flow control valve 35 and a remote control valve 36 are arranged.

Each of the pellet injectors or pipe guns 11 comprises a solenoid valve 37 for high-pressure gas injection and an injector tube or gun barrel 19, and the valve outlet is connected to the barrel 19 by means of a connecting tube 38. Each pipe gun 19 is formed as a continuous tube length which is preferably made from stainless steel. The end portion of the gun barrel 19 adjacent to the connecting tube 38 is provided with three axially spaced metal rings 39 and 40 which are preferably made from pure copper, and which may be soldered to the outer surface of the gun barrel 19. Each of the rings 39 and 40 is thermally connected to the cryostat 13, for example by means of a metal wire 41, such as copper wire. Each of the rings 39 and 40 is also provided with an electrical heating device 42 and temperature detector 43. The heat conductivity of the metal wire 41 connecting the centre ring 39 to the cryostat 13 is preferably higher than the heat conductivity of the other wires 41, and the centre ring 39 is cooled to a temperature below the condensing temperature of the gas to be condensed, and the temperatures of the metal rings 39 and 40 may be controlled by means of the heating devices 42 so as to form a freezing section surrounded by the centre ring 39 and so as to create suitable axial temperature gradients between the centre ring 39 and the adjacent outer rings 40. Therefore, when a gas to be condensed is supplied into the injector tubes or gun barrels 19 from the gas source 33 as indicated by an arrow in FIG. 3, a pellet 44 of condensed gas is formed within the centre ring 39.

Figures 2, 3:
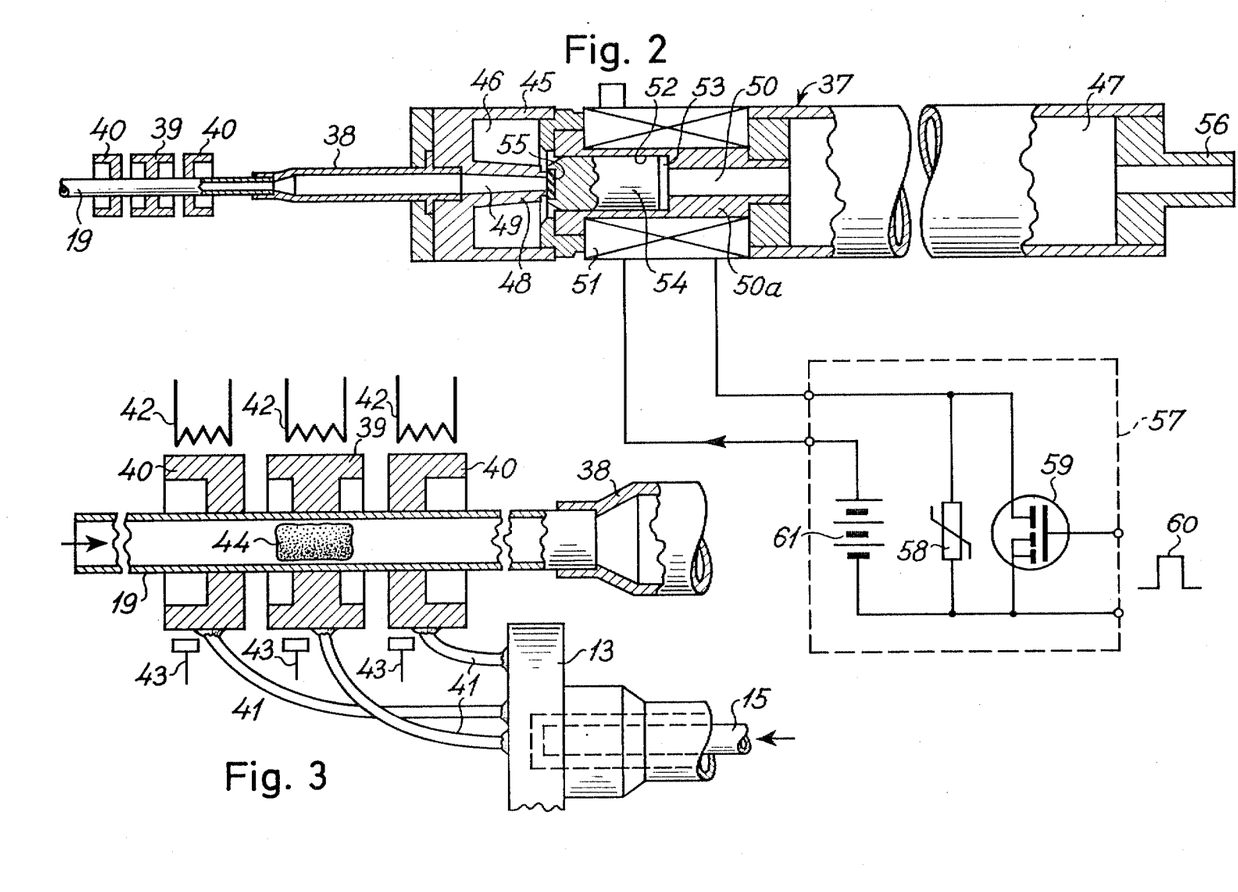
FIG. 2 is a side view and partially sectional view of an embodiment of the solenoid valve according to the invention shown in an enlarged scale.
FIG. 3 is a side view and partially sectional view showing the tube or barrel of an embodiment of the pellet injector or pipe gun according to the invention, FIG. 4 diagrammatically illustrates a pellet injector assembly comprising a plurality of injector tubes or gun barrels which may be connected to a common inlet for gas to be condensed.

The solenoid valve 37 shown in FIG. 2 comprises a housing 45 defining an annular chamber 46 and a greater reservoir chamber 47. The annular chamber 46 surrounds a central projection 48 forming a valve seat at its free end and defining an axially extending outlet bore 49 communicating with the connecting tube 38. The chambers 46 and 47 are interconnected by a connecting bore 50 which is surrounded by a solenoid 51. The connecting bore 50 formed in a tubular member 50a has an enlarged portion 52 so as to form a shoulder 53 between the narrow and the enlarged portion of the bore 50. An armature or valve member 54 comprising a sealing member 55 for cooperating with the valve seat is displaceably arranged within the enlarged portion 52 of the bore 50. The tubular member 50a and the valve member 54 are made from soft magnetic iron. The axial length of the valve member is slightly smaller than the axial distance between the valve seat and the shoulder 53 so that the valve member 54 may move only a small axial distance between a closed position shown in FIG. 2 and an open position in which the valve member is in abutting engagement with the shoulder 53. The valve member 54 fits into the enlarged bore portion 52 with a rather loose fit so that gas supplied to the chamber 47 from the gas source 16 through a gas inlet 56 may flow through the connecting bore 50, past the valve member 54 and into the chamber 46.

The valve 37 may be operated by means of an electric circuit 57 connected to the solenoid 51 and comprising a non-linear resistor 58 which is arranged in parallel with a remote control switch 59 which may be operated by an electric pulse as indicated by 60. The solenoid 51 and the parallelly coupled resistor 58 and switch 59 are connected in series with a voltage source 61. When the switch 59 is open, the resistance of the resistor 58 will be sufficiently high to prevent a substantial current from flowing through the solenoid 51. When a pellet 44 has been formed within the gun barrel 19 and is to be fired into the reactor, an electric pulse 60 is supplied causing the switch 59 to close for a very short period of time whereby the voltage source 61, which may be 5–600 V, is connected for a short period to the solenoid 51 which may be for only 24 V. The current pulse thus provided causes the valve member 54 to open suddenly whereby high pressure gas from the chamber 46 flows through the outlet bore 49 and the connecting tube 38 into the adjacent end of the gun barrel 19 whereby the pellet 44 is expelled from the gun barrel at a high velocity. The sudden pressure drop in the chamber 46 causes a fast movement of the valve member 54 back to its closed position, because the higher pressure within the chamber 47 drives the piston-like valve member 54 towards its closed position. When the switch 59 has been closed and suddenly opened again, a high voltage will be induced within the solenoid 51. Because of the non-linear character of the resistor 58, a corresponding current is allowed to flow through the resistor whereby breakdown of the switch 59 is avoided. The voltage of the voltage source 61 and the time in which the switch 59 is open may be chosen so as to obtain sufficiently fast opening of the valve 37 and for sufficiently long time.

As shown in FIG. 6 a plurality of pellet injectors or pipe guns 11 may be mounted within the same vacuum chamber 12 having a cylindrical wall 61 with a radial flange to which an end wall 63 is releasably fastened by bolts 64 or similar fastening means. As all of the pipe guns 11 are mounted in the end wall 63, they may easily be removed for service or replacement by removing the end wall 63. The vacuum chamber 12 may be connected to a vacuum pump (not shown) through a vacuum conduit 65 (FIG. 1) and radiation shields (not shown) for protecting the freezing sections of the gun barrels against heat radiation should also be provided.

Figures 4, 5:
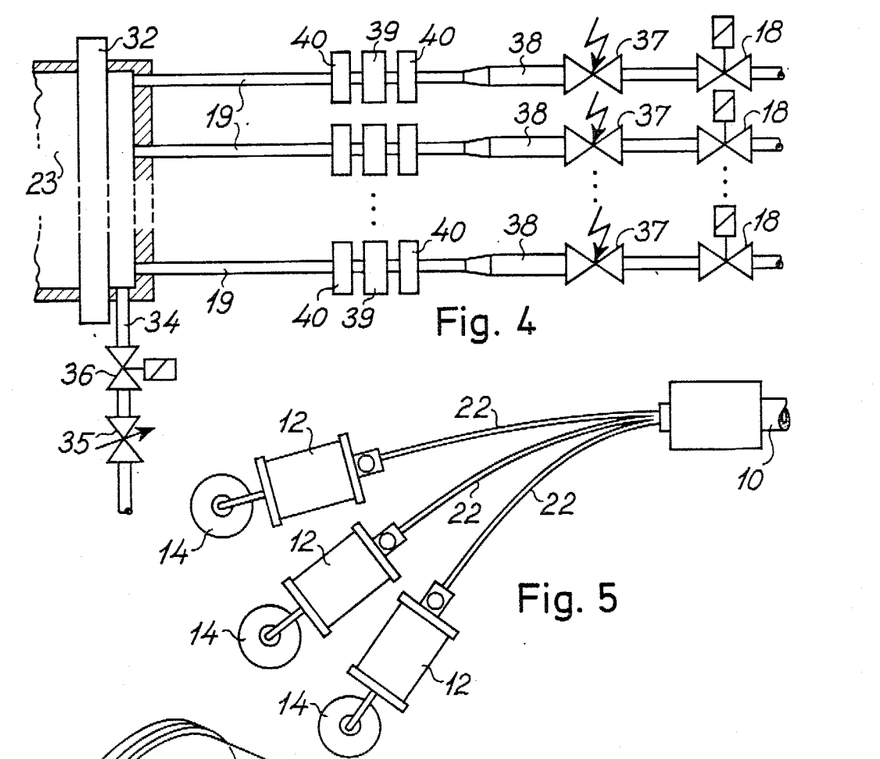

As shown in FIG. 5 a number of pipe gun assemblies each containing eight pipe guns may be arranged side by side with curved guide tubes 22 so that pellets fired from all of the pipe guns may be shot into the reactor 10 at substantially the same point.

When a pipe gun is fired, the gun barrel is to some extent heated by the pressure pulse of driving gas. The thermal interconnection of the pipe guns should not allow any substantial thermal interaction between the pipe guns to allow successive firing of the pipe guns with very small time intervals. This could be obtained by using connecting materials having a relatively high specific heat at low temperatures. Heat transport between the pipe guns will then be neglectable within the short time interval in which firing of the various pipe guns of the assembly takes place.

As indicated in FIG. 1 the operation of the whole system may be controlled by an electronic device 66 for control and data collection, such as a PLC and/or a PC. The electrical connections to the heating devices 42, the temperature detectors 43 and possible other electrical devices arranged within the vacuum chamber 12 may form an electric cable 67 passing though the end wall 63. As indicated in FIG. 1 the electric control device 66 may receive signals from the temperature detectors 43 and from electronic devices 68 mounted in the guide tube 22 for detecting the velocity of the pellets fired. Electrical control signals may be sent from the electrical control device 66 to the heating devices 42 for controlling the temperature of the metal rings 39 and 40, to the valves 32 and 36 so as to supply gas to be condensed from the gas source 33 to the gun barrels 19, and to the valves 18 and 31 as well as the circuits 57 so as to fire pellets formed in the various pipe guns in the desired succession. It is understood that the differential chambers 23 and 27 are used in a conventional manner to prevent substantial amounts of driving gas from reaching the reactor 10.

In the following examples the invention will now be described more in detail with special reference 7–9. However, FIG. 7 only shows part of a system similar to that shown in FIG. 1, and the same reference numerals will be used for similar parts.

EXAMPLES

Example 1

Figure 7:
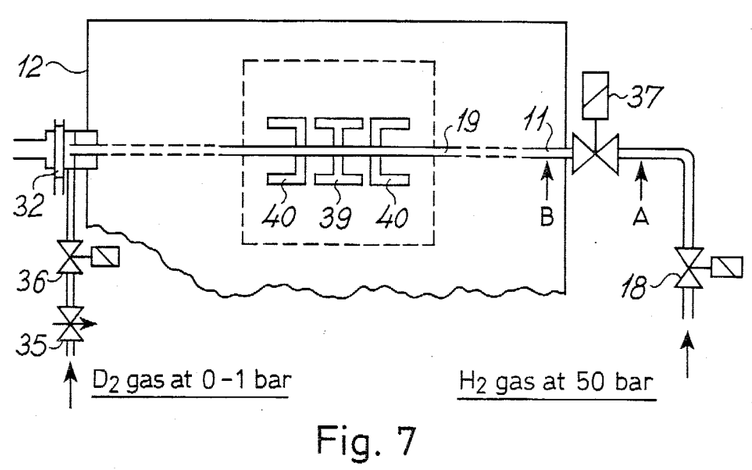

In a test stand diagrammatically shown in FIG. 7, a single pipe gun 11 of the type shown in FIG. 3 with a gun barrel 19 formed by a continuous tube was used. The three rings 39 and 40 were made from annealed, electrolytic copper and were attached to the barrel 19 by tin soldering. Each ring was supplied with an electrical heater 49 and was thermally connected to the liquid helium cryostat 13 by means of a wire 41 of annealed copper.

The thermal connections were chosen so that the outer rings 40 were kept at a somewhat higher temperature than the centre ring 39, so as to provide thermal gradients between the rings. These gradients could be increased by means of the heaters 42 associated with the outer rings 40. For each heater low and high current setting were possible. With a low current, the temperatures of the three rings could be adjusted to obtain the temperature gradients desired. With a high current, a ring could be pulse heated to loosen a pellet.

The pipe gun 11 was made from a brass tube. The inner diameter of the tube was 5.0 mm, and the wall thickness was 0.5 mm. However, the wall thickness of the tube was reduced to 0.25 mm between the rings 39 and 40. Large and slow pellets 44 of hydrogen were made for injection into an arc chamber in an arc gun experiment. Pellets from 13 to 20 mm length containing from 200 to 340 bar.cm$^3$ of hydrogen gas were made and fired with velocities from 40 m/s to 200 m/s with low propellant gas pressures. The hydrogen gas was let in through the gun muzzle and through a side tube located between the fast valve 37 and the safety valve 18 at a position indicated by A in FIG. 7.

Example 2

Figure 8:
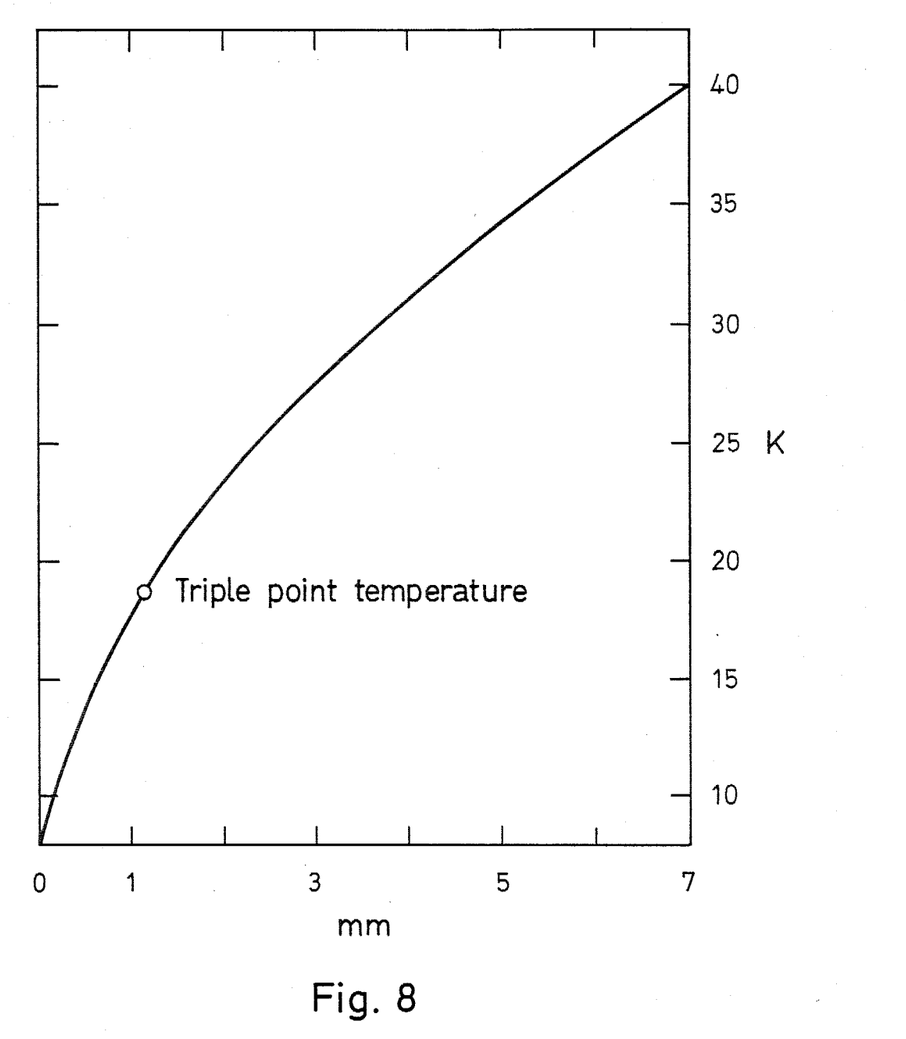
FIG. 8 is a diagram illustrating the temperature variation between the centre ring and the outer rings of the pellet injector tube, and FIG. 9 are photographs of pellets when fired.

In the test stand shown in FIG. 7 and described above in Example 1, pellets were made from condensed deuterium. The pipe gun made from brass was replaced by a stainless steel tube 19 with an inner diameter of 2 mm and a wall thickness of 0.3 mm. The axial thickness of the rings 39 and 40 was 2 mm, while the distance between them was 7 mm. The heat conductivity of stainless steel decreases with decreasing temperatures to go below 3 mW/cm K at 4.2 K. The temperature variation between the centre ring 39 held at 8 K and one of the outer rings at 40 K is shown in FIG. 8. The triple point of normal deuterium is at 18.7 K corresponding to a pressure of 171 mbar. This corresponds to 1.15 mm outside the freezing section in the plot and thus the pellet cannot extend further outside the centre ring 39. If the pellet material is condensed from a gas at a lower pressure, the pellet will become shorter since the gas will not condense at a temperature higher than that corresponding to the vapour pressure. At 15 K the vapour pressure is 16.4 mbar, and when condensed from this pressure the pellet will extend only 0.65 mm outside the centre ring 39. Thus, it is possible to change the pellet length by varying the feed gas pressure and the temperature gradients.

On the test stand shown in FIG. 7, the gun fires into a vacuum chamber 23 evacuated by a rotary pump 26, and therefore the gate valve 32 in front of the barrel 19 opens for as short a time as possible.

The pellet quality depends on the temperature during condensation. Pellets made at temperatures that are too low or too high disintegrate during acceleration. The best pellets are made at a temperature of around 8.5 K. The pellet material condensed outside the freezing section is condensed at a higher temperature and thus differs in quality from that formed inside the freezing section. Obviously, the pellet will be most uniform if made as short as possible, i.e. from gas at the lowest practical pressure.

The gas condenses on the inner tube wall inside and just outside the centre ring 39 or freezing section, and the freezing section is gradually filled up with the condensed gas. When the gas condenses on an existing layer of solid deuterium, there will be a temperature drop through this layer, i.e. the gas will condense at a higher and higher temperature. Therefore, the pellet material will not be uniform. Furthermore, the condensation will occur further and further from the ends of the centre ring 39 or freezing section at higher and higher temperatures. Therefore, the pellet shape will be a cylinder where the ends are inwardly hollow as normally seen on photographs made of such pellets. Both of these two effects will be the less pronounced the lower the gas feed pressure. Gas is conventionally fed from both ends of the barrel 19. A branched tube with an electromagnetic valve should then be provided between the fast valve 37 and the pellet position, i.e. at a position indicated by B in FIG. 7. This solution is inconvenient for two reasons: Firstly, the branched tube should have a much smaller diameter than the barrel to reduce the disturbance of the propeller gas pressure burst. This sets a practical lower limit to the diameter of the gun barrel. Secondly, the valve of the branched tube should be able to close for two flow directions, and for one direction it should even be able to close for a high pressure.

The pipe gun would be much simpler if one could feed gas only from the muzzle end. It was found that it is possible to make good pellets in this manner with strong temperature gradients at both ends of the freezing section and with a low gas feed pressure. The deuterium gas was supplied from a gas reservoir 33 at a pressure of 40 mbar or lower and condensation thus occurs at pressures below such pressure.

Figure 9:
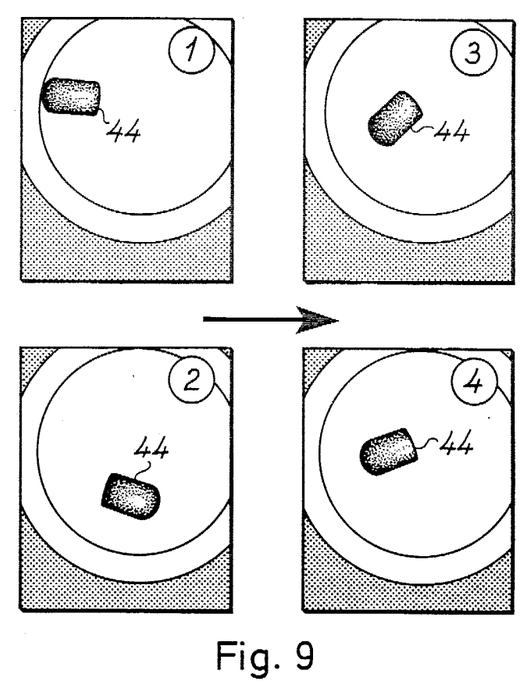

Pellets were fired with a propellent gas at a pressure of 40 bar. The distance between the fast valve 37 and the pellet forming position or the freezing section was 100 mm, while the total barrel length was 285 mm. The velocities for 18 successive shots of pellets made and fired under the same conditions varied between 970 and 1000 m/s. Pellets were flash photographed and photos of four pellets are shown in FIG. 9 where the photos marked "1" and "2" are from the same run, while the photos marked "3" and "4" are from another run. The direction of movement of the pellets is indicated by an arrow in FIG. 9. The length to diameter ratio of the pellets was determined to be about 1.5. It was also noted that the rear end of the pellets looked less homogeneous than the front end. No attempts were made to measure the sizes of the individual pellets.

The pellet gun 19 was operated automatically with a PLC 66, and the operation was divided into three phases, namely pellet formation, firing and cooling after firing.

In the first phase the outer rings 40 were heated to establish the temperature gradients, and gas was thereafter let in to form the pellet. The total heating effect from the electrical heater 42 on the centre ring 39 and from the inflowing gas should be such that the pellet is formed at the right temperature. After formation of a pellet, the heaters were turned off and the whole gun was cooled. For a gas reservoir pressure of about 40 mbar the duration of this phase was about 120 seconds.

In the second phase the safety valve upstream of the fast valve 37 and the gate valve 32 downstream of the muzzle were opened. The heater 42 on the central ring 39 (high current) was turned on in order to loosen the pellet. After that the pellet was fired. The duration of this phase was about 1 second.

In the last phase the whole gun cooled down to be ready for the next firing. The duration of this phase should be 30 seconds or more.

It should be understood that various amendments, combinations and modifications of the embodiment described above could be made without departing from the scope of the present invention.

We claim:

1. A pellet injector for injecting pellets of condensed gas into a reactor, said pellet injector comprising
a continuous length of a metal tube,
a first mass of heat conductive material arranged around a freezing section of said tube length in good thermal contact with the outer surface thereof,
second and third masses of heat conductive material arranged on either side of and closely axially spaced from said first mass and in good thermal contact with the outer surface of the tube length,
means for introducing a gas into the tube length,
cooling means for providing a temperature below the condensing temperature of said gas and being thermally connected to each of said masses so as to condense the gas within the freezing section,
means for selectively heating said masses to control the size of the pellet, and
means for pneumatically expelling a pellet formed in the freezing section from the tube length.

2. A pellet injector according to claim 1 wherein said gas introducing means are connectable to a first end of the tube length, while the pneumatic expelling means are connectable to a second end of the tube length so as to expel the pellet through said first end.

3. A pellet injector according to claim 1, wherein said masses are metal rings integrally connected to and surrounding the outer surface of the tube length.

4. A pellet injector according to claim 3, wherein said metal rings are made from pure copper.

5. A pellet injector according to claim 4, wherein said metal rings are made from annealed electrolytic copper.

6. A pellet injector according to claim 1, wherein said first, second and third masses are connected to the cooling means by first, second and third heat conductive members, respectively.

7. A pellet injector according to claim 6, wherein said heat conductive members are made from pure copper.

8. A pellet injector according to claim 7, wherein said heat conductive members are made from annealed electrolytic copper.

9. A pellet injector according to claim 6, wherein the second and third heat conductive members are somewhat less heat conductive than said first heat conductive member.

10. A pellet injector according to claim 2, wherein said pellet expelling means comprise a solenoid valve for connecting said second end of the tube length to a source of highly pressurized gas for an ultra-short period of time.

11. A pellet injector according to claim 10, wherein said solenoid valve comprises a housing defining first and second chambers therein interconnected by an interconnecting passage, a valve seat positioned at said first chamber, and a piston-like valve member unit comprising a valve member and a valve armature and being arranged in said passage so as to substantially obstruct the same and so as to be movable therein between closed and opened positions, in which the valve member is in sealing engagement with and out of engagement with the valve seat, respectively, said second chamber having a gas inlet for connecting the valve to said pressurized gas source.

12. A pellet injector according to claim 11, wherein the solenoid valve comprises a gas outlet extending axially into said first chamber and defining said valve seat at its free end, said first chamber having an annular shape and surrounding the gas outlet.

13. A pellet injector according to claim 10, wherein said freezing section is arranged adjacent to said second end of the tube length.

14. A pellet injector according to claim 13, wherein said second end of the tube length is connected to the expelling means by a connecting tube having an inner diameter exceeding that of the tube length.

15. A pellet injector according to claim 10, wherein the solenoid of the solenoid valve is connected to an electric voltage source through a switch or circuit breaker which is connected in parallel with a non-linear resistor having a resistance decreasing at increasing potential differences.

16. A pellet injector according to claim 1, wherein the tube length is made from stainless steel.

17. A pellet injector according to claim 1, wherein the wall thickness of the tube length is reduced between said masses of heat conductive material.

* * * * *

UNITED STATES PATENT AND TRADEMARK OFFICE
CERTIFICATE OF CORRECTION

PATENT NO. : 4,904,441

DATED : 27 February, 1990

INVENTOR(S) : Hans Sorensen, Bjarne Saas, Knud V. Weisberg

It is certified that error appears in the above-identified patent and that said Letters Patent is hereby corrected as shown below:

Col. 4, line 5, ":le" should be --the--

Col. 8, line 47, after "reference" insert --to Figs.--

Col. 12, line 26, "10" should be --2--

Signed and Sealed this

Twenty-eighth Day of May, 1991

Attest:

HARRY F. MANBECK, JR.

*Attesting Officer*  *Commissioner of Patents and Trademarks*